(12) United States Patent
Xia (10) Patent No.: US 11,654,619 B2
(45) Date of Patent: May 23, 2023

(54) IMMERSION MULTI-MATERIAL PROJECTION MICRO STEREOLITHOGRAPHY WITH NON-STICK GAS PERMEABLE TRANSPARENT MEMBRANE

(71) Applicant: BMF MATERIAL TECHNOLOGY INC., Guangdong (CN)

(72) Inventor: Chunguang Xia, San Diego, CA (US)

(73) Assignee: BMF MATERIAL TECHNOLOGY INC., Guangdong (CN)

( * ) Notice: Subject to any disclaimer, the term of this patent is extended or adjusted under 35 U.S.C. 154(b) by 115 days.

(21) Appl. No.: 17/183,425

(22) Filed: Feb. 24, 2021

(65) Prior Publication Data

US 2021/0276249 A1     Sep. 9, 2021

Related U.S. Application Data

(60) Provisional application No. 62/984,461, filed on Mar. 3, 2020.

(51) Int. Cl.
| | |
|---|---|
| *B29C 64/129* | (2017.01) |
| *B29C 64/393* | (2017.01) |
| *B33Y 50/02* | (2015.01) |
| *B33Y 10/00* | (2015.01) |

(52) U.S. Cl.
CPC .......... *B29C 64/129* (2017.08); *B29C 64/393* (2017.08); *B33Y 10/00* (2014.12); *B33Y 50/02* (2014.12)

(58) Field of Classification Search
None
See application file for complete search history.

(56) References Cited

U.S. PATENT DOCUMENTS

2021/0237345 A1*  8/2021  Xia ..................... B29C 64/227

FOREIGN PATENT DOCUMENTS

| CN | 109466061 A | * | 3/2019 | .............. B22F 3/115 |
| WO | WO-2016115095 A1 | * | 7/2016 | .............. B33Y 10/00 |

* cited by examiner

*Primary Examiner* — Joseph S Del Sole
*Assistant Examiner* — Guy F Mongelli
(74) *Attorney, Agent, or Firm* — Dilworth IP, LLC (57) ABSTRACT

A method for multi-material high resolution projection micro stereolithography for 3-D printing of a sample, comprising: A) generating a 3D digital model of the sample to be printed in a computer, B) arranging a lens having an optical axis, a charge coupled device (CCD), and a printing head relative to a surface of a substrate, C) positioning the printing head, D) moving the printing head relative to the substrate by moving the substrate, the printing head, or both the substrate and the printing head, E) sending an image from the control computer to an LCD micro display chip, projecting the image from the LCD or DLP chip through the lens onto a surface of the flat tip of the printing head, and F) and changing the printing material to be used for printing a following layer or layer section.

17 Claims, 5 Drawing Sheets

IMMERSION MULTI-MATERIAL PROJECTION MICRO STEREOLITHOGRAPHY WITH NON-STICK GAS PERMEABLE TRANSPARENT MEMBRANE

The present invention provides an improved method for faster printing over a larger-area while using multiple printing materials, e.g., typically light curable resins, and often at least 4 printing materials used without sacrificing the resolution available from existing projection micro stereolithography methods, a 3D printing technology. For example, many embodiments make use of a printing head sealed by an oxygen permeable membrane, which quickly switching in use printing materials, e.g., resins, while scanning layers in a stepwise manner during the large-area printing. The method invented here is not limited to this particular 3D printing method; it is also valid for any other type of method using a laser beam/spot scanning in 3D printing.

BACKGROUND

Stereolithography was originally conceived as a rapid prototyping technology. Rapid prototyping refers to a family of technologies that are used to create true-scale models of production components directly from computer aided design (CAD) in a rapid (faster than before) manner. Since its disclosure in U.S. Pat. No. 4,575,330, stereolithography has greatly aided engineers in visualizing complex three-dimensional part geometries, detecting errors in prototype schematics, testing critical components, and verifying theoretical designs at relatively low costs and in a faster time frame than before.

During the past decades, continuous investments in the field of micro-electro-mechanical systems (MEMS) have led to the emergence of micro-stereolithography (µSL), which inherits basic principles from traditional stereolithography but with much higher spatial resolution e.g., K. Ikuta and K. Hirowatari, "Real three dimensional micro fabrication using stereo lithography and metal molding," 6th IEEE Workshop on Micro Electrical Mechanical Systems, 1993. Aided by single-photon polymerization and two-photon polymerization techniques, the resolution of µSL was further enhanced to be less than 200 nm, e.g., S. Maruo and K. Ikuta, "Three-dimensional microfabrication by use of single-photon-absorbed polymerization," Appl. Phys. Lett., vol. 76, 2000; S. Maruo and S. Kawata, "Two-Photon-Absorbed Near-Infrared Photopolymerization for Three-dimensional Microfabrication," J. MEMS, vol. 7, pp. 411, 1998; S. Kawata, H. B. Sun, T. Tanaka and K. Takada, "Finer features for functional microdevices," Nature, vol. 412, pp. 697, 2001.

The speed was dramatically increased with the invention of projection micro-stereolithography (PµSL), Bertsch et al., "Microstereophotolithography using a liquid crystal display as dynamic mask-generator", Microsystem Technologies, p 42-47, 1997; Beluze et al., "Microstereolithography: a new process to build complex 3D objects, Symposium on Design, Test and microfabrication of MEMs/MOEMs", Proceedings of SPIE, v3680, n2, p 808-817, 1999. The core of this technology is a high resolution spatial light modulator, which is either a liquid crystal display (LCD) panel or a digital light processing (DLP) panel, each of which are available from micro-display industries.

While PµSL technology has been successful in delivering fast fabrication speeds with good resolution, further improvements are still wanted.

The display size of a DLP chip is limited to about 13 mm currently, therefore when the projected pixel size is same as the physical pixel size (5 to 8 microns), the single exposure area is limited to half inch. To print on a larger area with single projection, one needs to increase the size of the projected pixels, thus reducing the printing resolution (namely the size of the projected pixel). PµSL provides no significant advantage in multi-material fabrication, since switching materials during PµSL processes will dramatically reduce the speed. Therefore, new technologies based on coating-then-jet-cleaning (Kavin Kowsari, 3D Printing and Additive Manufacturing. September 2018.185-193) or print-then-flush methods (Han D. et al, Additive Manufacturing, 2019. 27: p. 606-615) were introduced to improve the speed, but the air bubbles issue(s) or the large amount of resin consumed impairs the application of these technologies. Thus, a fast and large-area PµSL technology capable of multi-material fabrication is still needed.

There are three types of resin layer definition methods in PµSL: the first uses a free surface where the layer thickness is defined by the distance between the resin free surface and the sample stage. Due to the slow viscous motion of resins, when the printing area is larger than 1 cm×1 cm, it takes more than half hour to define a 10 um thick resin layer of viscosity of 50 cPs. The second and the third methods use either a transparent membrane or a hard window. Again, for both cases, there is currently no good method for defining 10 um or thinner resin layers over an area of 5 cm×5 cm or larger, especially for the membrane case, even if it is faster than the free surface case, it is still impractically slow. As for the hard window case, the fluidic dynamic force created as the sample closes in to define the thin layer before exposure or during the separation after exposure is big enough to damage the samples.

In all 3D printing technologies, accuracy and efficiency in dimension replication is very important. For example, in immersion multi-material PµSL systems (FIG. 1), it is very important to have high accuracy and efficiency in dimension control for all layers, so that the actual CAD model can be duplicated in a practical period of time.

SUMMARY OF THE INVENTION

The method of the present invention provides not only more precise control, with greater speed and desired layer thickness in a larger printing area, for example, 10 cm×10 cm printing area with 10 um layer thickness, but also allows switching the printing material, e.g., switching at least 4 resins during the printing process. In one embodiment, the present method uses a printing head scanning the sample stepwise, wherein the printing head can e.g., be as big as one exposure of a full DLP chip or only part of the DLP chip. The method greatly improves the dimensional accuracy of samples printed using, e.g., PµSL systems, and significantly improves the printing speed by combining the printing material change, e.g., resin change, and coating process together. Printing materials as used herein refer to materials, typically resins, e.g. light curable resins, that are used in the industry to print and cure in constructing layers in 3-D printing operations.

The printing head used in the invention and has a hard flat tip at one end. The inner walls of the printing head and the tip define an inner-cone. Attached to the outer surfaces of the inner-cone are individual printing material or resin delivery channels. In one embodiment of the invention, the inner-cone of the printing head is covered and sealed by a nonstick transparent membrane or hard window at the tip. In some embodiments the membrane/hard window can comprise gas permeable materials, particularly oxygen permeable materials, for example, Polydimethylsiloxane (PDMS) or Amorphous Fluoropolymer, a copolymer made from 2,2-bistrifluoromethyl-4,5-difluoro-1,3-dioxole and tetrafluoroethylene, such as Teflon™ AF from DuPont. The individual channels are flat and are attached to the outside of the inner-cone. In many embodiments, at least 4 resin channels squeeze out different resins and coat the top of the sample as needed.

In one embodiment, the printing head can be attached to an ultrasound source with frequencies of over 10 kHz to increase the flow speed of the resin. In another embodiment, the printing head can have a pressure control to compensate for the deformation of the membrane or hard window due to the contact with the printing material. The pressure controlled gas can be the gas that prevents the sample from sticking to the membrane or hard window during polymerization, such as oxygen or its mixture.

For example, in many embodiments, the invention makes use of a system comprising: i) a LCD or DLP micro display chip together with a light source displaying the digital images from the computer, ii) a lens having an optical axis, iii) a printing head with a sealed, optically transparent, and gas permeable flat tip, iv) a charge-coupled device (CCD) capable of monitoring the projection on the printing head, v) three precision stages to control the motion of the sample substrate or the printing head in X, Y, and Z directions, and vi) a resin vat to catch excessive any resin that drips from the printing head. The system is arranged relative to a surface of a substrate so that the lens is situated between the surface of the substrate and the CCD and it is gravitationally above the substrate, the optical axis of the lens intersects the surface, and the CCD is focusable through the lens along the optical axis.

In one embodiment, with aid from XY stages, the immersion multi-material PµSL provides three printing modes. When only a single sample needed, which is smaller than the single exposure size, it is called single exposure mode. If multiple samples are needed, the XY stages will move stepwise and print the same sample in an array, which is called array exposure mode. As the sample size increases to exceed the size of the single exposure, the system will further divide one layer into multiple sections and stitch the adjacent sections into a whole layer by overlapping 5 um to 20 um on the shared edges. This is the stitching exposure mode. It is also possible to combine the stitching mode with array mode.

In one embodiment of the invention, the interpolated offset error curves based on the measured data from actual samples will be fed into the translation of the XY stages to compensate the mechanical tolerances to ensure the accuracy of the stitching-printed sample is within the specifications.

In one embodiment, the tip of the printing head is above the sample, or the substrate if this is for the first layer. The distance between the flat tip of the printing head to the top of the sample or the substate is the thickness of the current layer. As one exposure is finished, the printing head squeezes the resin and at the same time moves into the new area, wherein the hard edge on the tip of the inner cone serves as a resin coating scraper. The coating thickness is defined by the gap between the flat tip of the printing head and the top layer of the sample. In this invention, we present the configuration of moving the sample in XYZ directions, but in some embodiments, one can instead move the printing head with the sample keep stationary.

DISCUSSION OF THE INVENTION

Figure 2:
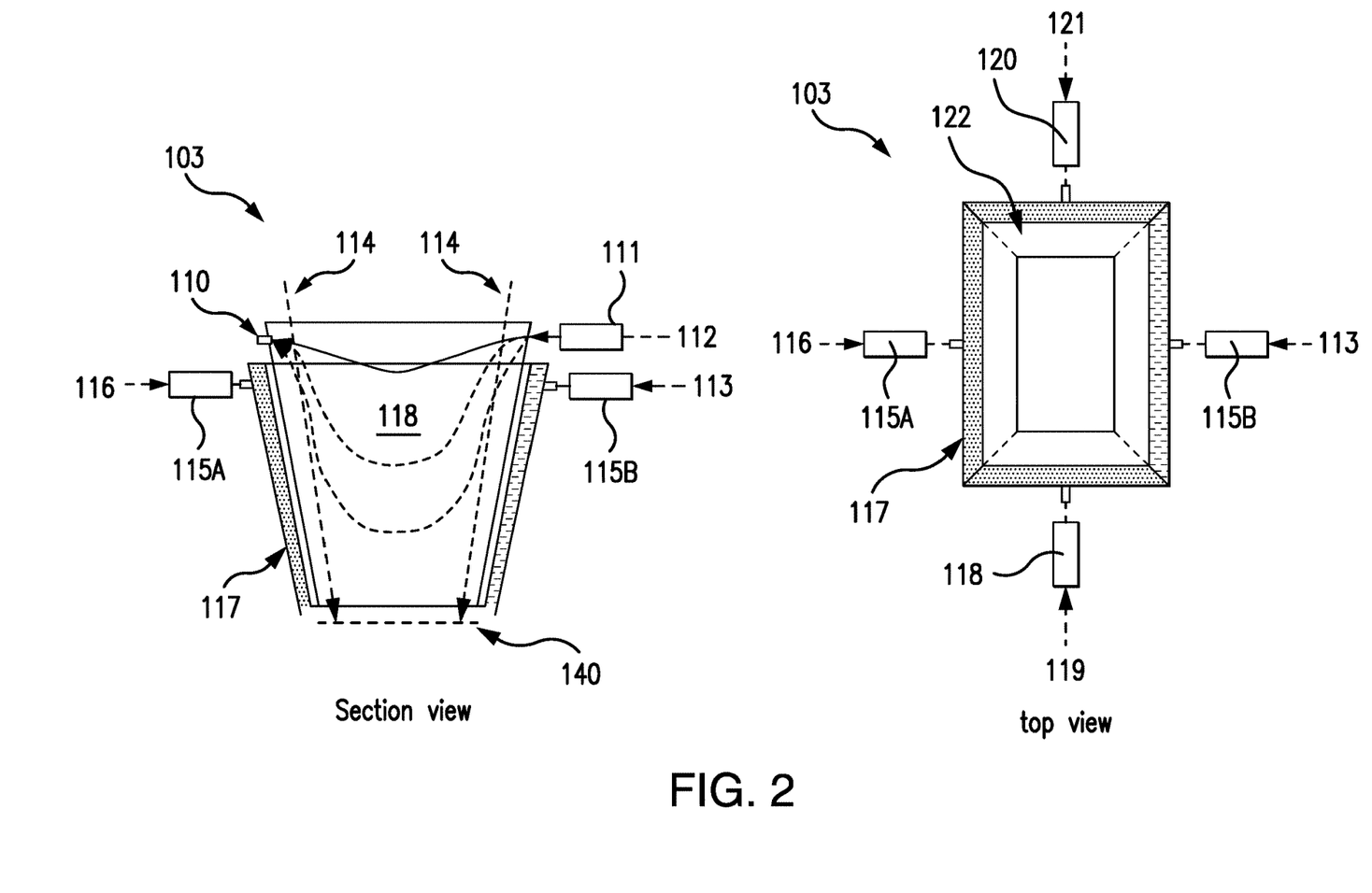
FIG. 2 is a schematic drawing of the printing head in an immersion PµSL system.

In one embodiment of the invention, the method is aided by a nonstick printing head 103 as in FIG. 2, illustrating section and top views of the printing head 103, e.g., as part of the DLP/lens/CCD device/displacement system discussed above. Typically, the size of the transparent window of the printing head is sized to cover a single DLP/LCD chip projection. For example, the projection of 17 mm chip is 20 mm with 10 µm pixel resolution, and then the diagonal of the rectangle window can be around 24 mm. In this particular embodiment, the transparent window at the tip of the printing head is a 130 um-thick membrane of amorphous fluoropolymer Teflon™ AF from DuPont, which is gas permeable and with superior optical clarity. The gas permeability, especially oxygen permeability, makes this film nonstick during photo polymerization as the oxygen is a photo-crosslinking inhibitor. In other embodiments, Polydimethylsiloxane (PDMS) membrane or a PDMS coated hard window can also be used for the same purpose. As the printing head 103 is contacting the resin, the tip of the head is sealed liquid tight. The deflection at the center of the membrane in the resin due to the hydraulic pressure is described by the following equation assuming the linear elasticity for the membrane:

$$\frac{3(1-v^2)}{16}\left(\frac{pa^4}{Eh^3}\right)$$

Where $v$ is the Poisson ratio of the membrane, $\alpha$ is the radius of the circular membrane tip, E is the Young's modulus, h is the thickness, and p is the pressure difference on both sides of the membrane. It shows the deformation of the tip is proportional to the pressure difference; therefore, it is possible to eliminate the deflection of the membrane by controlling the pressure 118 in the printing head 103 and thus the pressure difference on both sides. The liquid pressure on the wet surface of the window, i.e., the surface contacting uncured resins or other printing materials, can be caused by the excessive resin trapped under the membrane. Therefore, the pressure inside the printing head 103 should be controlled to compensate for the liquid pressure in order to eliminate the deformation of the membrane window. The combination of a mass flow controller (MFC) 111, a downstream flow restrictor and a pressure transducer on the printing head control the pressure P 118 in the printing head 103. The thickness of the nonstick, oxygen inhibition layer can be improved by increasing the concentration of oxygen in the printing head 103; hence a flow of various oxygen concentration mixtures can be used by the MFC 111 to control the pressure. The membrane together with the seal piece form part of the inner-cone of the printing head 103. Attached to the outer surfaces of the cone are the resin delivery channels. The four channels are conformed to the shape of the inner-cone and are flat. These channels, in this case these four channels, are connected to liquid flow controllers (LFC) 115A, 115B, 118, and 120 and shut off valves. Each LFC controls the flow rate of one resin. The resins are incompressible, therefore the LFC and shut off valve are upstream of the slit outlet but can still control and stop the flow instantly. This will minimize the resin usage during the printing.

Figure 3:
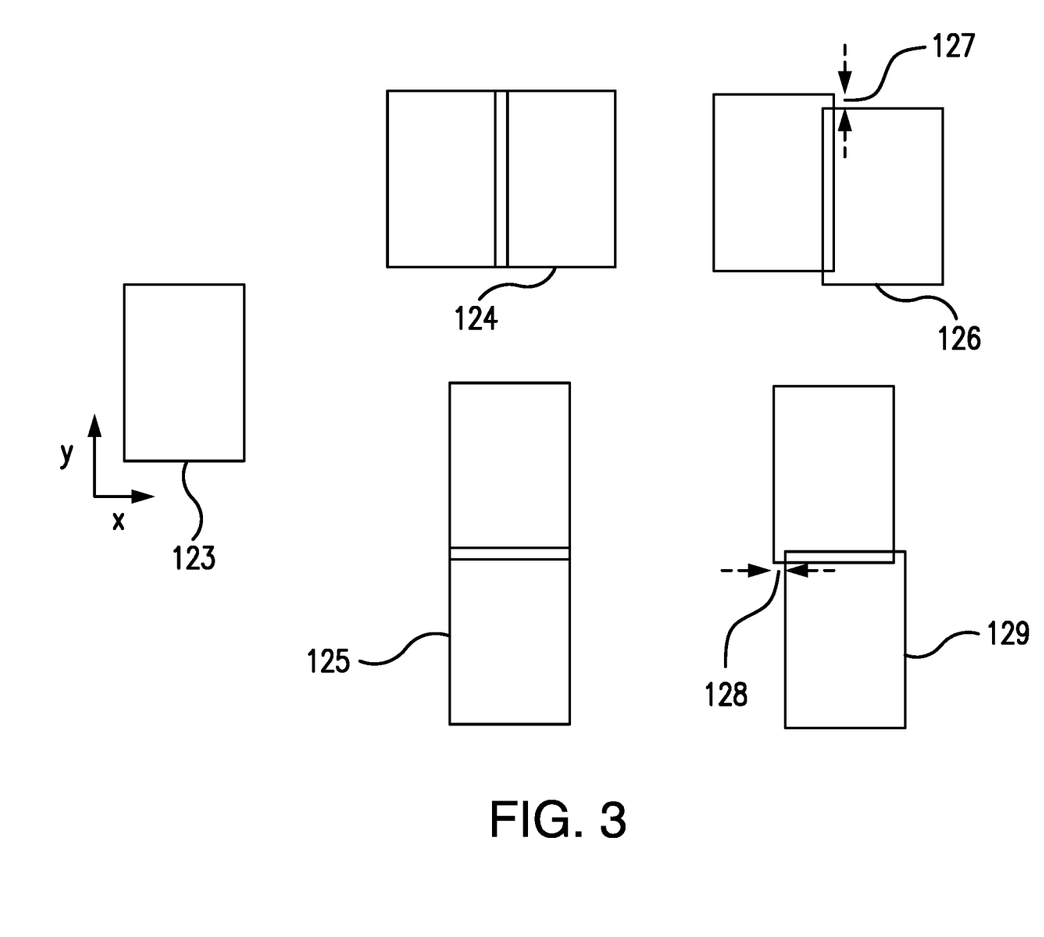
FIG. 3 tells the stitching errors in x and y direction during the stitch printing in an immersion multi-material PµSL system.

The printing process starts with generating a 3D model in the computer and then slicing the digital model into a sequence of images, wherein each image represents a layer (5 to 20 micrometers) of the model. The control computer sends an image to the micro display chip and the image is projected through the lens onto the bottom surface (the wet surface) of the printing tip. The bright areas are polymerized whereas the dark areas remain liquid. Due to the size limit of either LCD or DLP chip, for example a DLP chip with 1920×1080 pixels at 10 um printing optical resolution, a single exposure only covers area of 19.2 mm×10.8 mm. Therefore, if the cross-section of a sample is larger than 19.2 mm×10.8 mm, it cannot be printed with single exposure method. In the present invention, a multiple-exposure stitching printing method is provided. By this method, an image representing a layer of the 3D model is further divided into multiple smaller images with each image no larger than the DLP pixel resolution. For instance, an image of pixel resolution of 3800×2000 can be divided into four 1900×1000 sub-images with each one represents a quarter of this layer. As a result, a full layer of the model will be printed section by section based on the sub-images. To improve the mechanical strength of the shared edges of the adjacent sections, typically there is about a 5-20 micron overlap on the edges. The precise position and the amount of overlap are accurately controlled by the XY stage assembly. There are two coordinate systems: one is aligned with the DLP/LCD panel, the other one is the XY stage assembly. When these two coordinate systems are not parallel due to the assembly tolerance, there will be offset errors on the shared edges of adjacent sections. As shown in FIG. 3, 123 is the size of a single exposure; 124 is the result of precise alignment on x direction; 126 is the result with error offset on x direction 127; 125 is the result of precise alignment on y direction; 129 is the result with error offset on y direction 128. In precision printing, with error requirements less than 10 um, stage assembly tolerance is usually off the allowed range; and the offset is not linear to the stage travel distance. Therefore, in the invention, offsets are measured at 5 or more evenly distributed points on both x and y directions on the full-range printed square sample. The at least second order polynomial interpolated offset error curves will be fed into the translation of the XY stages to compensate the offset thus ensure the accuracy of the stitching-printed sample is within the specifications.

Figure 4:
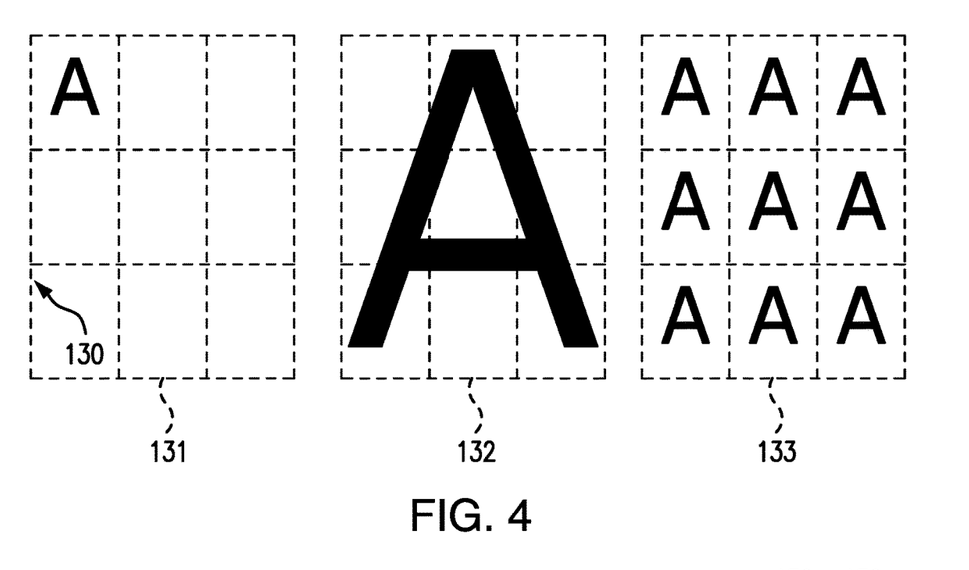
FIG. 4 shows the three printing modes in an immersion multi-material PµSL system.

With aid of the XY stages, the immersion multi-material PμSL provides basically three printing modes (FIG. 4).

When printing a single sample, which is smaller than the single exposure size, the XY stages will not move during printing if only one printing material is needed in the exposure area. However, for a multi-material case, XY stages move to coat the selected resin. It is called single exposure mode 131. If multiple identical samples are needed, the XY states will move stepwise and print the same sample in an array. And this is called array exposure mode 133 which is must faster for small volume production than repeating the single exposure mode 131. As the sample size increases to exceed the size of the single exposure, the system will further divide one layer into multiple sections and stitch the adjacent sections into a whole layer by overlapping 5 um to 20 um on the shared edges. This is the stitching exposure mode 132. It is possible to combine the stitching mode 132 with array mode 133 when one needs multiple identical samples but needs stitching exposure as the sample is larger than single exposure. However, this case is usually treated as stitching exposure mode 132.

Figure 5:
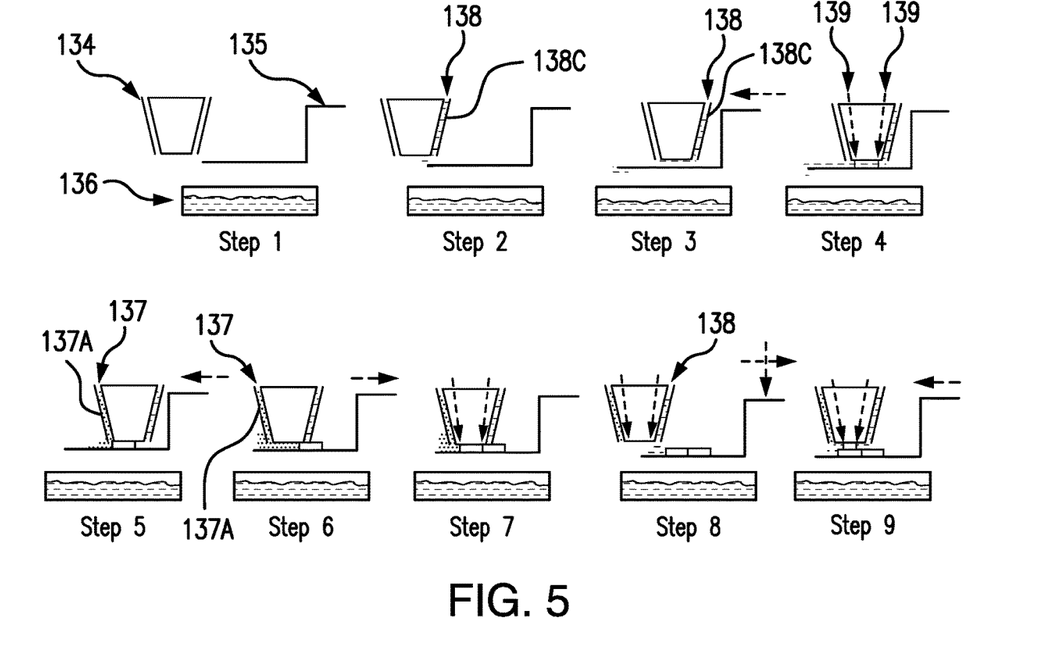
FIG. 5 shows the steps for the printing operation in an immersion multi-material PµSL system.

In some embodiments, the printing head is on top of the sample, or substrate if this is the first layer, with a distance between the two is equal to the thickness of current layer (FIG. 5). In the case of two opposite resin channels A 137A and C 138C as an example (FIG. 5), in order to coat resin C 138 on the substrate, the C channel 138C needs to be placed in the moving direction of the printing head with respect to the substrate during coating. In this invention, the substrate moves, but moving the printing head can serve the same purpose. As the substrate moves, resin C 138 is squeezed out of the slit outlet of the flat channel and immediately scraped by the hard edge on the inner-cone of the printing head onto the surface of the substrate if a first layer, or the top of the sample as shown in step 2 and 3. When resin C 138 is coated on the substrate or sample, it may take a few seconds to let the new resin layer contacting the membrane settle. Then the DLP projects the layer image onto the wet surface of the membrane in step 4. To change the material to A 137 for the adjacent area, the printing head 134 moves to make sure the channel A 137A is 2 to 3 mm from the designated printing area as in step 5 then starts to squeeze resin A 137, moving and scraping as in step 6. After the DLP projects the image on resin A 137 in step 7, the substrate adjusts the channel C 138C position to print the next layer in steps 8 and 9. During the scraping of the resin, it is critical to control the resin flow speed from the LFC to guarantee that the thickness of the new layer is correct. A lower than needed resin flow rate will cause the layer to be thinner than designed, as the vacuum effect due to less resin will pull the membrane towards the sample or substrate. There is a minimum flow rate of resin based on the conservation of volume during the coating process:

$$R = H * t * V$$

Figure 6:
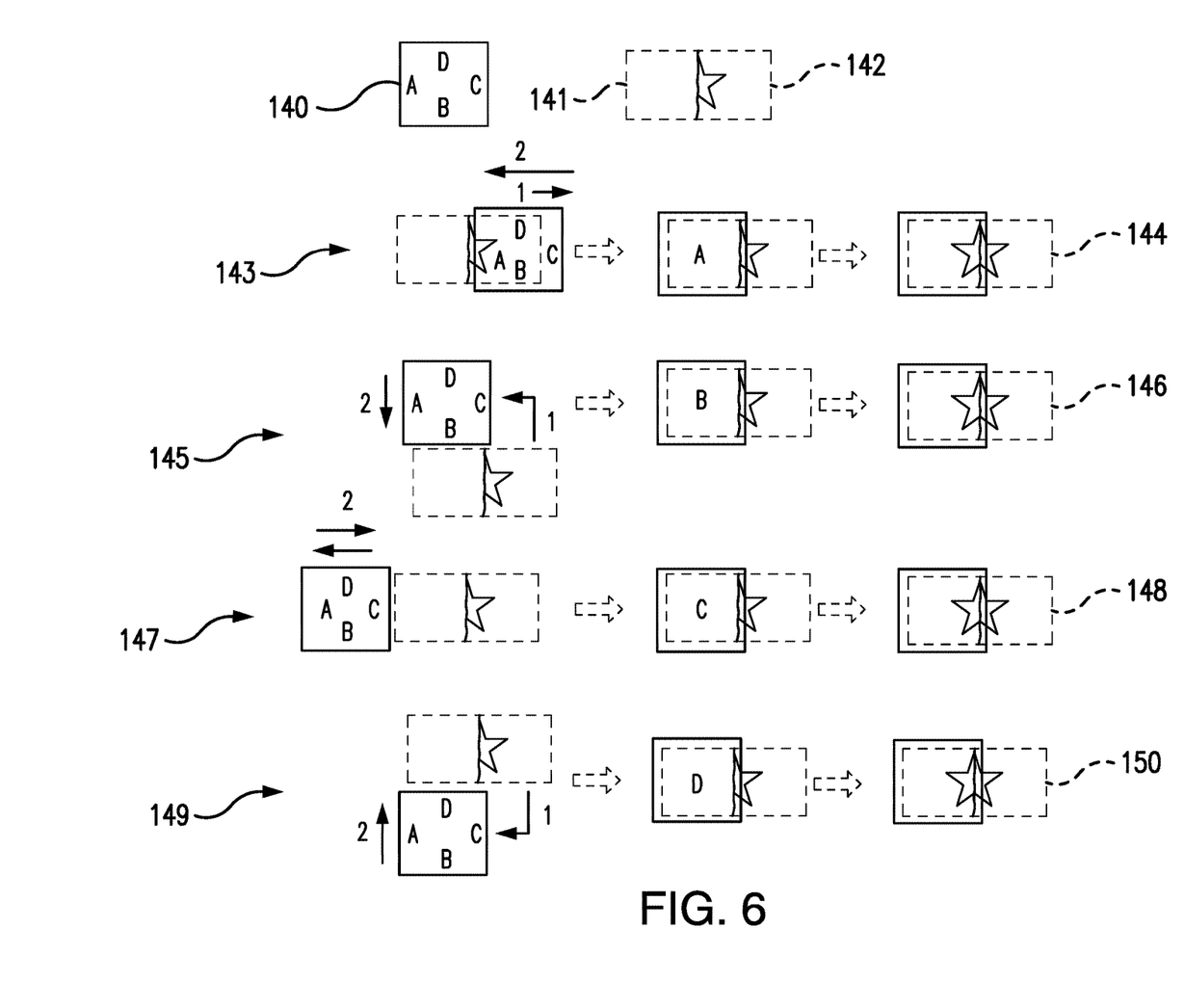
FIG. 6 shows the steps for material switching during immersion multi-material projection micro stereolithography

Here R is the volume flow rate, H is the width of the printing head 134, t is the thickness of current layer and V is the relative speed between the printing head 134 and the substrate. The flow rate needs to be higher than this value and further be optimized based on the viscosity of the resin. Thinner resins tend to flow and drip to a resin vat 136 below, as a result the flow rate needs to be higher. The movement of the printing head depends on which resin is to be used for the next area. As shown in FIG. 6, the number 1 and 2 represent the sequence of the stage movement. For example, in the printing of material A 143 or printing of material C 147, the substrate first moves the channel A 137A or channel C 138C 2 to 3 mm away from the new area but keep facing the new area, then the printing head squeezes and coats the fresh resin on the new area during the scraping movement. Operation is similar with the printing of material B 145 and the printing of material D 149, but the substrate needs to move and turn to align the designated channel with the new area. During printing the movement of the printing head 134 against the sample is always shear movement. After the whole layer is printed, the printing head 134 will move outside the sample boundary before the sample stage moves down a layer thickness to define the next layer of fresh resin. By keeping only the shear movement between the printing head 134 and the sample, the interaction force between the printing head and the sample is only the fluid shear force. This force is much smaller than the perpendicular or normal separation of two surfaces in resin which is typical in existing PµSL. As shown in the following equation:

$$\sigma = -pI + 2\mu\varepsilon$$

Here $\sigma$ is the fluid stress tensor, p is the pressure, I is the identify tensor, $\mu$ is the fluid viscosity and $\varepsilon$ is velocity gradient tensor (or fluid strain tensor). For two surfaces almost contacting each other, separation in a resin with a viscosity of 50 cPs at speed of 10 mm/s, the vacuum effect is normally at an order of 1e5 Pas. But if the two surfaces slice against each other at a 20 um gap, the force is at an order of 1e2 Pas. Therefore, this method dramatically reduces the possibility of damaging or deforming the sample. After the new layer space is defined by dropping the substrate, the printing head will move in and start to scan and print the next layer stepwise. In this invention, we present a configuration of moving the sample in XYZ directions, but in some embodiments, one can move the printing head while keeping the sample stationary.

Figure 1:
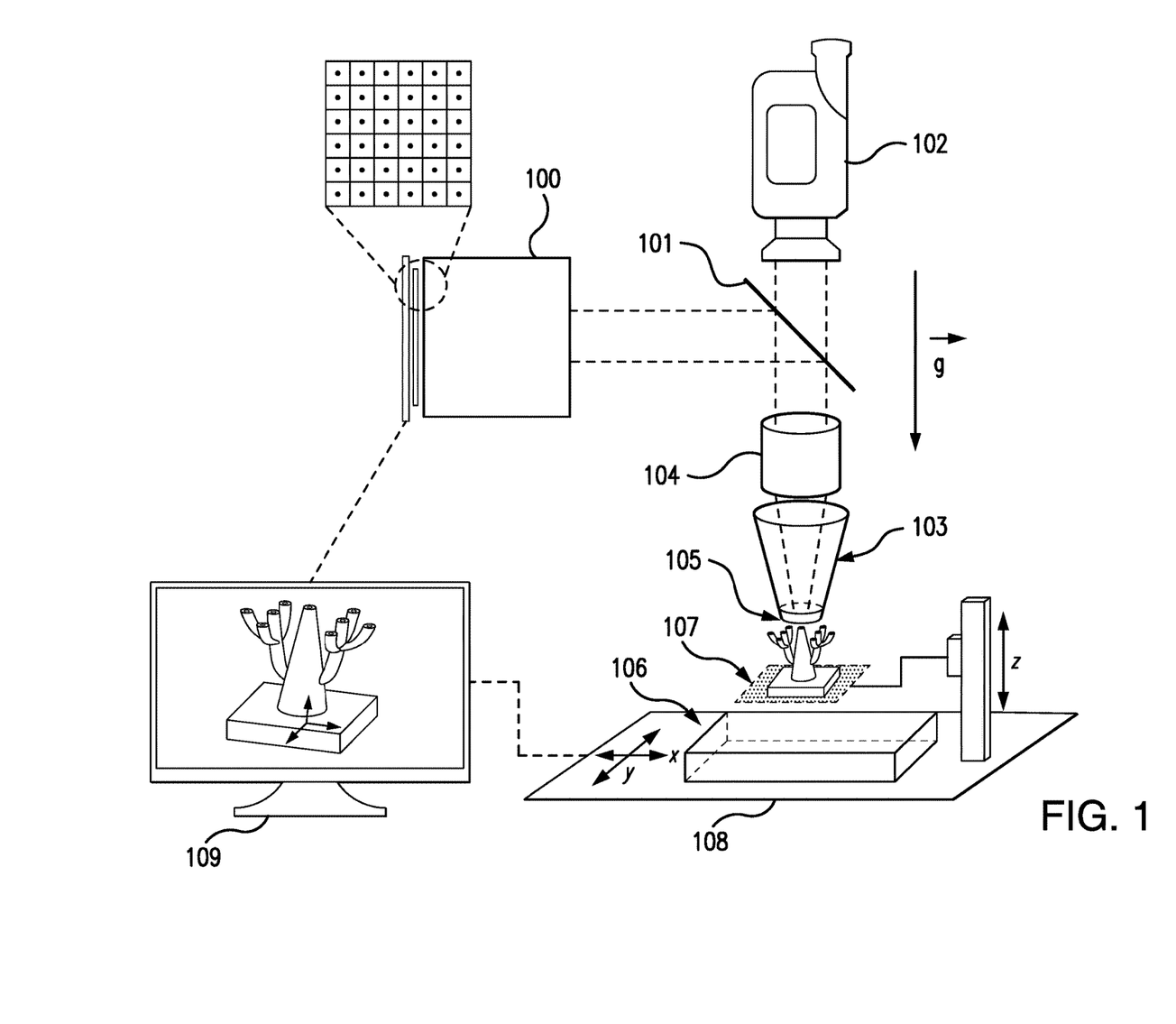
FIG. 1 a schematic drawing of the immersion multi-material projection micro stereolithography system.

Referring now to FIG. 1, it shows a schematic drawing of an immersion multi-material PµSL system; including a digital light processing panel (DLP) and light source 100, beam splitter 101, charge coupled device (CCD) 102, projection lens 104, nonstick window 105, resin vat 106, sample substrate 107, xyz stage assembly 108, and video unit 109. Referring now to FIG. 2, it shows a schematic drawing of the printing head in an immersion multi-material PµSL system with a section and top view. The section view includes image projection 114, oxygen mixture 112, mass flow controller (MFC) 111, pressure in the printer head 118, restrictor 110, liquid flow controllers 115A and 115B, resin A 116, resin C 113, resin spreader 117, and resin permeable membrane 140. The top view includes liquid flow controllers 115A, 115B, 118 and 120, resin A 116, resin C 113, resin B 119, resin D 121, and inner cone 122. Referring now to FIG. 3, it shows a stitching error in the x and y directions during stitch printing in an immersion multi-material PµSL system, including 123 as the size of a single exposure; 124 is the result of precise alignment on x direction; 126 is the result with error offset on x direction 127, and 125 is the result of precise alignment on y direction; 129 is the result with error offset on y direction 128. Referring now to FIG. 4, it shows a three exposure modes in an immersion PµSL system, including printing borders 130, single exposure 131, stitching exposure 132, and array exposure 133. Referring now to FIG. 5, it shows steps (1-9) for switching material printing in an immersion multi-material PµSL system, including printing head 134, substrate arm 135, resin vat 136, resin C 138, resin A 137, resin channel A 137A, and resin channel C 138C. Referring now to FIG. 6, it shows steps for material switching in an immersion multi-material projection micro stereolithographic system, including printing head with 4 resins 140, new area 141, exposed area 142, material A printing 143, image projection on material A 144, material B printing 145, image projection on material B 146, material C printing 147, image projection on material C 148, material D printing 149, and image projection on material D 150.

What is claimed:

1. A method for multi-material projection micro stereolithography for 3-D printing of a sample, wherein printing materials can be changed based on a selected delivery channel on a side of a printing head, wherein the printing head has a flat tip at a side of the printing head that is closest to a substrate or the sample during printing, wherein the flat tip is positioned at a distance from the substrate or sample, has a hard edge that functions as a coating material scraper, and each coating thickness is equal to a distance between the flat tip and the substrate or sample, and wherein the printing head has inner walls, the inner walls and the flat tip define an inner cone, the printing head is sealed by a non-stick, gas permeable, transparent membrane or window at the tip, and wherein the inner-cone has outer surfaces attached to flat printing material delivery channels, wherein each of the delivery channels deliver a different printing material from the others, the printing method comprising:

A) positioning the printing head so that a side carrying the delivery channel that conveys the printing material for a present layer is first along a line traversing the substrate or sample, which line designates a direction that brings the printing head to a printing area;

B) moving the printing head relative to the substrate or sample by moving the substrate or sample, the printing head, or both the substrate or sample and the printing head, so that the printing head covers the printing area, wherein as the printing head moves to cover the printing area the printing material is squeezed out of an outlet of the delivery channel carrying the printing material for the present layer, which printing material is immediately scraped by the hard edge of the flat tip onto a surface of the substrate or sample, and then stopping the movement of the printing head relative to the substrate or sample and the squeezing of the printing material once the printing head covers the printing area;

C) sending an image from a control computer to an LCD micro display chip or a DLP micro display chip, projecting the image from the LCD or DLP chip through a lens onto a surface of the flat tip of the printing head and irradiating the projected image with light;

D) and changing the printing material to be used for printing a following layer or layer section by moving the printing head off the printing area, positioning the printing head so that a side carrying the delivery channel with the printing material for the following layer or layer section is first along a line traversing the following printing area designating a direction that brings the printing head to the following printing area, then printing and scraping as in steps A, B and C, wherein the following printing area is in a new layer atop the layer just printed or a layer section adjacent to a layer section already printed.

2. The method according to claim 1 wherein after a whole layer is printed, the printing head will move outside a periphery of the sample, after which a sample stage moves down a distance equal to a thickness of a next layer of printing material before a next layer is printed.

3. The method according to claim 1 wherein the printing materials consist of light curable resins.

4. The method according to claim 3 wherein the outer surfaces of the inner-cone of the printing head are attached to at least 4 delivery channels, each delivery channel attached to a different surface on a different side of the inner-cone.

5. The method according to claim 3 wherein an image for projecting to the printing head is larger than the single exposure size and the method comprises dividing the image into multiple layer sections, printing the layer sections stepwise and stitching them into a whole layer, wherein the printing of each section overlaps boundaries of adjacent sections by 5 um to 20 um on shared edges.

6. The method according to claim 1 wherein the membrane or hard window comprises oxygen permeable materials.

7. The method according to claim 6 wherein the membrane or window comprises polydimethylsiloxane or amorphous polytetrafluoroethylene.

8. The method according to claim 7 wherein a pressure in the printing head is controlled to compensate for deformation of the membrane or window due to contact with the printing material.

9. The method according to claim 8 where in the pressure in the printing head is controlled by controlling a flow rate of a gas introduced into the printing head.

10. The method according to claim 9 wherein the gas introduced into the printing head comprises oxygen.

11. The method according to claim 9 wherein the pressure P in the printing head is controlled by a combination of a mass flow controller (MFC), a downstream flow restrictor and a pressure transducer on the printing head control.

12. The method according to claim 8 wherein the delivery channels are connected to a liquid flow controller and a shut-off valve wherein each liquid flow controller controls a flow rate of one light curable resin.

13. The method according to claim 12 wherein an ultrasound source with frequency larger than 10 kHz is attached to the printing head to increase the resin flow rate.

14. The method according to claim 1 wherein the motion of the printing head is controlled by three precision stages in X, Y, and Z directions.

15. The method according to claim 1 wherein the motion of the substrate or sample is controlled by three precision stages in X, Y, and Z directions.

16. The method according to claim 1 wherein precision stages control the motion of the printing head and/or the substrate or sample in at least X and Y directions.

17. The method according to claim 16 wherein interpolated offset error curves based on measured data from samples are fed into the translation of the XY stages to compensate for mechanical tolerances to ensure that accuracy of a stitching-printed sample is within specifications.

* * * * *